(12) United States Patent
Chen et al.

(10) Patent No.: US 10,958,158 B2
(45) Date of Patent: Mar. 23, 2021

(54) CONTROLLING DISCHARGE OF X-CAPACITANCE

(71) Applicant: Infineon Technologies Austria AG, Villach (AT)

(72) Inventors: Shih-Jeng Chen, New Taipei (TW); Shi-Heng Hong, New Taipei (TW); Martin Krueger, Oberschleißheim (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/558,842

(22) Filed: Sep. 3, 2019

(65) Prior Publication Data

US 2020/0099287 A1 Mar. 26, 2020

(30) Foreign Application Priority Data

Sep. 24, 2018 (DE) .................. 10 2018 123 382.5

(51) Int. Cl.
*H02M 1/32* (2007.01)
*H02M 7/06* (2006.01)
(Continued)

(52) U.S. Cl.
CPC .............. *H02M 1/32* (2013.01); *H02M 7/06* (2013.01); *H02M 7/21* (2013.01); *H02M 2001/0009* (2013.01); *H02M 2001/322* (2013.01)

(58) Field of Classification Search
CPC ............ H02M 3/07; H02M 1/32; H02M 1/42; H02M 1/4225; H02M 1/12; H02M 1/126; H02M 2001/322; H02M 7/06
See application file for complete search history.

(56) References Cited

U.S. PATENT DOCUMENTS 9,837,917 B1 12/2017 Furtner et al.
2010/0309694 A1* 12/2010 Huang .................. H02M 1/126
363/49
(Continued)

FOREIGN PATENT DOCUMENTS

CN 105119476 A 12/2015
DE 20 2010 017 938 U1 5/2013
(Continued)

OTHER PUBLICATIONS

Office Action, DE 10 2018 123 382.5, dated Jun. 5, 2019, pp. 12.

*Primary Examiner* — Gustavo A Rosario-Benitez
(74) *Attorney, Agent, or Firm* — Armis IP Law, LLC (57) ABSTRACT

An AC/DC converter is operative to receive, via AC input terminals, an AC input signal and to transform the AC input signal into a DC output signal. The AC/DC converter comprises a first DC discharge circuit coupled to AC input terminals. The controller comprises a second DC discharge circuit having a controllable switching element for switching the second DC discharge circuit on and off. The second DC discharge circuit is operative to receive a DC discharge current from the first DC discharge circuit; logic associated with the AC/DC converter repeatedly: receives a DC sense signal from the second DC discharge circuit and determines, based on the value of the DC sense signal within a predetermined measurement time period, loss of the AC input signal. In response to determining loss of the AC input signal, the logic controls activation of the second DC discharge circuit depending on the DC sense signal.

28 Claims, 4 Drawing Sheets

(51) Int. Cl.
*H02M 7/21* (2006.01)
*H02M 1/00* (2006.01)

(56) References Cited

U.S. PATENT DOCUMENTS

| | | |
|---|---|---|
| 2011/0025278 A1 | 2/2011 | Balakrishnan et al. |
| 2011/0031939 A1 | 2/2011 | Funaba et al. |
| 2013/0027999 A1* | 1/2013 | Ptacek .................. H02M 1/126 363/126 |
| 2013/0242626 A1* | 9/2013 | Li ........................... H02M 1/36 363/50 |
| 2014/0191693 A1 | 7/2014 | Funaba et al. |
| 2015/0146331 A1* | 5/2015 | Lee ...................... H02H 1/0007 361/56 |
| 2015/0263542 A1 | 9/2015 | Sato et al. |
| 2015/0365084 A1* | 12/2015 | Hirler .................. H03K 17/165 327/382 |
| 2016/0124029 A1 | 5/2016 | Gobbi et al. |
| 2016/0226371 A1* | 8/2016 | Tsou ....................... H02M 1/32 |
| 2016/0241135 A1* | 8/2016 | Zhao ..................... H02M 1/44 |
| 2016/0268919 A1 | 9/2016 | Halberstadt |
| 2017/0187217 A1* | 6/2017 | Gong .................... G01R 19/155 |
| 2017/0346325 A1* | 11/2017 | Ohtake .................. H02J 7/0063 |
| 2018/0006562 A1 | 1/2018 | Jiang et al. |
| 2018/0198363 A1* | 7/2018 | Watanabe ........ G01R 19/16538 |
| 2019/0074761 A1* | 3/2019 | Matsuda ................ H02M 1/32 |

FOREIGN PATENT DOCUMENTS

| | | |
|---|---|---|
| DE | 10 2015 109 370 A1 | 12/2015 |
| DE | 10 2015 116 154 A | 5/2016 |

\* cited by examiner

CONTROLLING DISCHARGE OF X-CAPACITANCE

TECHNICAL FIELD

This specification refers to embodiments of a controller for an AC/DC converter, to embodiments of a power converter apparatus having an AC/DC converter and a controller coupled thereto, and to embodiments of a method of controlling discharge an AC/DC converter.

RELATED APPLICATION

This application is related to and claims priority to earlier filed German patent application serial number 10 2018 123382.5 entitled "Controlling Discharge of X-Capacitance," filed on Sep. 24, 2018, the entire teachings of which are incorporated herein by this reference.

BACKGROUND

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

For example, a typical power converter is an AC to DC converter, which exhibits a circuit topology with one or more switching elements, such as MOSFETs, that allow converting an alternating current (AC) as input signal into a direct current (DC) as output signal. Of course, the input signal may also be provided as an alternating voltage, and the output signal as a direct voltage.

The transformation of the AC input signal to the DC output signal is typically controlled by a controller coupled to the AC/DC converter. Various topologies can be employed and various control algorithms can be implemented that allow efficient transformation of the AC input signal into the DC output signal.

Typical applications of an AC/DC converter include power supplies for mobile terminals, such as a smartphone, a notebook, a tablet and the like, and power supplies for stationary terminals, such as a television device or another consumer device.

The AC input signal of an AC/DC converter may hence be the voltage that is provided by the mains, e.g., the 120 V/60 Hz voltage, or the 230 V/50 Hz voltage and so on.

If the connection of the AC input signal to an AC/DC converter is interrupted, e.g., due to a user decoupling the AC/DC converter from the mains or another event causing interruption of the connection, e.g., a line break, a residual voltage may be stored by a capacitance of the AC/DC converter, said capacitance being also known as the x-capacitor or, respectively, the x-capacitance.

Such x-capacitance may need to be discharged quickly and in a controlled manner after the connection between the AC input signal and the AC/DC converter has been interrupted.

For example, a controller as described in the datasheet "Texas Instruments, UCC256301 Hybrid Hysteretic Mode Wide $V_{IN}$ LLC Resonant Controller, Enabling Ultra-Low Standby Power", SLUSCU6B—AUGUST 2017—REVISED AUGUST 2017, available at http://www.ti.com/lit/ds/symlink/ucc256301.pdf, provides a functionality regarding x-capacitor discharge.

BRIEF DESCRIPTION

According to an embodiment, a controller for an AC/DC converter is presented. The AC/DC converter is operative to receive, via AC input terminals an AC input signal and to transform the AC input signal into a DC output signal, wherein the AC/DC converter comprises a first DC discharge circuit coupled to the AC input terminals. The controller comprises a second DC discharge circuit having a controllable switching element for switching the second DC discharge circuit on and off, wherein the second DC discharge circuit is operative to receive a DC discharge current from the first DC discharge circuit; and a logic operative to repeatedly carry out the following steps: receiving a DC sense signal from the second DC discharge circuit and determining, based on the value of the DC sense signal within a predetermined measurement time period, loss of the AC input signal; in response to determining loss of the AC input signal, turning on the second DC discharge circuit; after elapse of a predetermined discharge time period after turning on the second DC discharge circuit, determining the value of the DC sense signal and, if the value has not decreased, turning off the second DC discharge circuit or, if the value has decreased, maintaining the second DC discharge circuit in the on state until a predetermined criterion is reached.

According to a further embodiment, a power converter apparatus is presented. The power converter apparatus comprises an AC/DC converter, the AC/DC converter being operative to receive, via AC input terminals, an AC input signal and to transform the AC input signal into a DC output signal, wherein the AC/DC converter comprises a first DC discharge circuit coupled AC input terminals. The power converter apparatus comprises a controller. The controller comprises a second DC discharge circuit having a controllable switching element for switching the second DC discharge circuit on and off, wherein the second DC discharge circuit is operative to receive a DC discharge current from the first DC discharge circuit; a logic operative to repeatedly carry out the following steps: receiving a DC sense signal from the second DC discharge circuit and determining, based on the value of the DC sense signal within a predetermined measurement time period, loss of the AC input signal; in response to determining loss of the AC input signal, turning on the second DC discharge circuit; after elapse of a predetermined discharge time period after turning on the second DC discharge circuit, determining the value of the DC sense signal and, if the value has not decreased, turning off the second DC discharge circuit or, if the value has decreased, maintaining the second DC discharge circuit in the on state until a predetermined criterion is reached.

According to a yet further embodiment, a method of controlling discharge of an AC/DC converter is presented. The AC/DC converter is operative to receive, via AC input terminals, an AC input signal and to transform the AC input signal into a DC output signal, wherein the AC/DC converter comprises a first DC discharge circuit coupled to AC input terminals. The method comprises employing a controller having a second DC discharge circuit having a controllable switching element for switching the second DC discharge circuit on and off, wherein the second DC discharge circuit is operative to receive a DC discharge current from the first DC discharge circuit. The method comprises repeatedly carrying out the following steps receiving a DC sense signal from the second DC discharge circuit; determining, based on the value of the DC sense signal within a predetermined measurement time period, loss of the AC input signal; in response to determining loss of the AC input signal, turning on the second DC discharge circuit; after elapse of a predetermined discharge time period after turning on the second DC discharge circuit, determining the value of the DC sense signal and, if the value has not decreased, turning off the second DC discharge circuit or, if the value has decreased, maintaining the second DC discharge circuit in the on state until a predetermined criterion is reached.

Those skilled in the art will recognize additional features and advantages upon reading the following detailed description, and upon viewing the accompanying drawings.

BRIEF DESCRIPTION OF THE DRAWINGS

The parts in the figures are not necessarily to scale, instead emphasis being placed upon illustrating principles of the invention. Moreover, in the figures, like reference numerals may designate corresponding parts. In the drawings.

DETAILED DESCRIPTION

In the following detailed description, reference is made to the accompanying drawings which form a part hereof and in which are shown by way of illustration specific embodiments in which the invention may be practiced.

In this regard, directional terminology, such as "top", "bottom", "below", "front", "behind", "back", "leading", "trailing", "above" etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appended claims. The drawings are not scaled and are for illustrative purposes only. For clarity, the same elements or manufacturing steps have been designated by the same references in the different drawings if not stated otherwise.

In the context of the present specification, the terms "in ohmic contact", "in electric contact", "in ohmic connection", and "electrically connected" intend to describe that there is a low ohmic electric connection or low ohmic current path between two regions, sections, zones, portions or parts of the device described herein. Further, in the context of the present specification, the term "in contact" intends to describe that there is a direct physical connection between two elements of the respective semiconductor device; e.g., a transition between two elements being in contact with each other may not include a further intermediate element or the like.

In addition, in the context of the present specification, the term "electric insulation" is used, if not stated otherwise, in the context of its general valid understanding and thus intends to describe that two or more components are positioned separately from each other and that there is no ohmic connection connecting those components. However, components being electrically insulated from each other may nevertheless be coupled to each other, for example mechanically coupled and/or capacitively coupled and/or inductively coupled. To give an example, two electrodes of a capacitor may be electrically insulated from each other and, at the same time, mechanically and capacitively coupled to each other, e.g., by means of an insulation, e.g., a dielectric.

Figure 1:
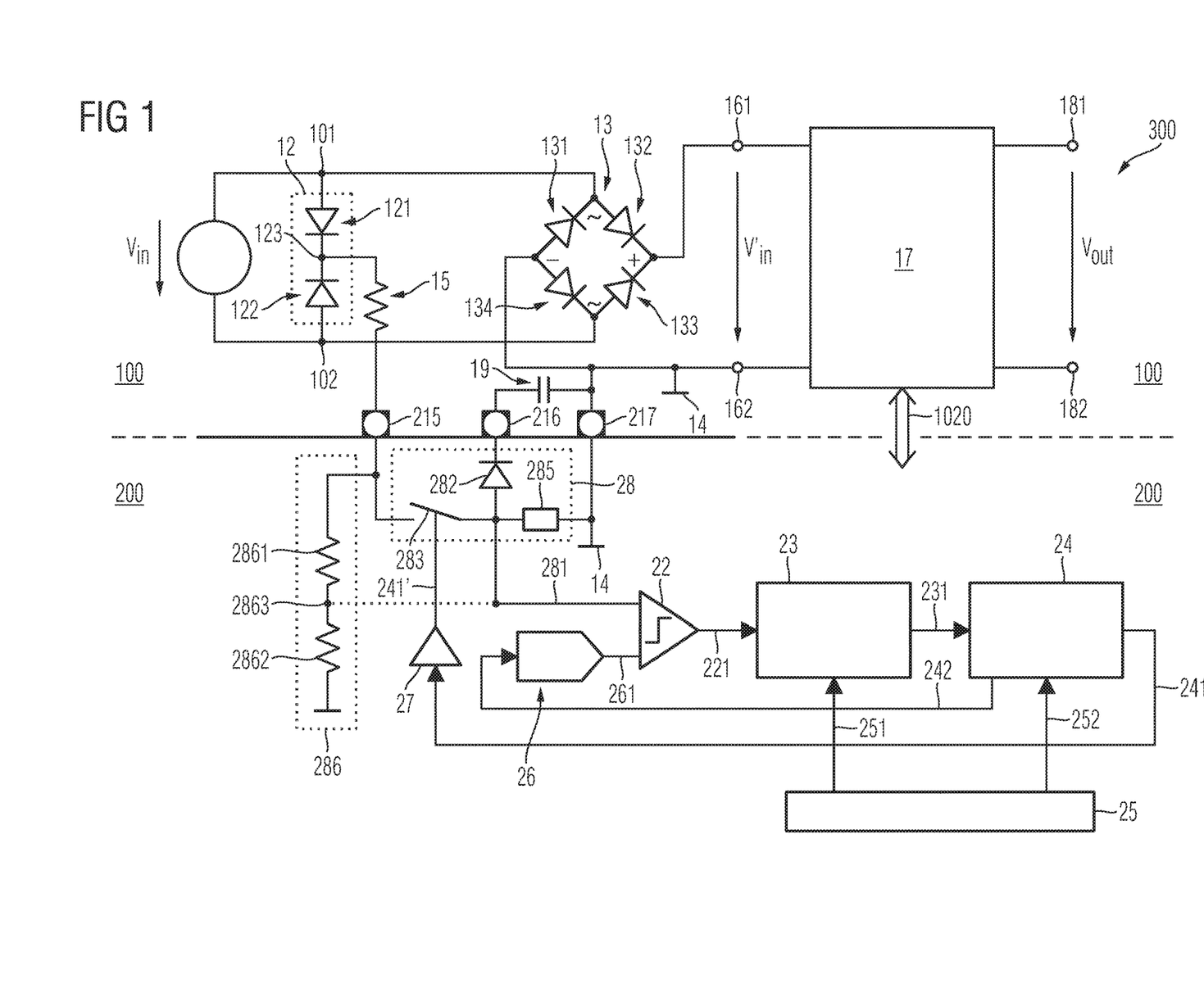
FIG. 1 schematically and exemplarily illustrates a section of a power converter with an AC/DC converter and a controller in accordance with one or more embodiments.

FIG. 1 schematically and exemplarily illustrates a section of a power converter apparatus 300 having an AC/DC converter 100 and a controller 200, in accordance with one or more embodiments.

The AC/DC converter 100 is operative to receive, via AC input terminals 101, 102, an AC input signal $V_{in}$ and to transform the AC input signal $V_{in}$ into a DC output signal $V_{out}$, the DC output signal $V_{out}$ being provided at DC output terminal 181, 182.

In an embodiment, the AC input signal $V_{in}$ is provided by the mains. Hence, the AC input signal $V_{in}$ can be an alternating voltage, e.g., the 120 V/60 Hz voltage, or the 230 V/50 Hz voltage. In another embodiment, the AC input signal $V_{in}$ can be another alternating voltage signal or an alternating current signal. For example, the AC input signal $V_{in}$ is provided by a UPS (uninterruptible power supply) where the AC input signal $V_{in}$ may rather resemble a square wave than a sine wave.

The AC/DC converter 100 further comprises a diode rectifier 13 having diodes 131, 132, 133, and 134 (e.g., connected to each other in the illustrated bridge configuration), the diode rectifier 13 being coupled to the AC input terminals 101, 102 and providing a DC intermediate signal $V_{in}'$ at terminals 161, 162. In an embodiment, this DC intermediate signal $V_{in}'$ can be buffered by means of a non-illustrated buffer capacitor. Terminal 161 can provide the high voltage signal, whereas terminal 162 can be electrically connected to ground/mass 14.

The DC intermediate voltage signal $V_{in}'$ is provided to converter block 17, which outputs the DC output signal $V_{out}$ at the DC output terminal 181, 182. Operation of the converter block 17 is controlled by means of the controller 200.

The controller 200 and the converter block 17 are operatively connected to each other by the schematically illustrated controller interface 1020. By means of the controller interface 1020, the controller 200 provides at least one control signal to the converter block 17, and receives at least one measurement signal from the converter block 17. For example, converter block 17 comprises at least one switching element (not illustrated), and the at least one control signal can be a control signal for controlling operation of the at least one switching element. The at least one measurement signal provided from the converter block 17 to the controller 200 may for example be a current sense signal or a voltage sense signal.

Converter block 17 may exhibit a DC/DC converter topology suited for converting the DC intermediate voltage signal $V_{in}'$ received via terminals 161, 162 into the DC output signal $V_{out}$ at the DC output terminal 181, 182. Various topologies and control algorithms are known to the skilled person, and the present specification is neither limited to a specific kind of a DC/DC converter topology nor to a specific control algorithm. Non-limiting examples include a flyback converter topology, a buck converter topology, a boost converter topology, a resonant converter topology, galvanically isolated topologies, non-galvanically isolated topologies and so on. The DC output signal, e.g., output voltage $V_{out}$, may be further provided by one or more DC/DC converters.

However, it shall be pointed out that the converter 100 of the power converter apparatus 300 is an AC/DC converter. For example, in another embodiment, the AC/DC converter 100 does not comprise the diode rectifier 13, but the AC input signal $V_{in}$ is directly provided to the converter block 17, which hence then exhibits an AC/DC converter topology suited for converting the AC input signal $V_{in}$ received via terminals 161, 162 (or another AC signal derived from the AC input signal $V_{in}$) into the DC output signal $V_{out}$ at the DC output terminal 181, 182. Also in this respect, various AC/DC converter topology and corresponding control algorithms are known to the skilled person, and also this embodiment is neither limited to a specific kind of an AC/DC converter topology not to a specific kind of control algorithm. Non-limiting examples include a dual boost topology, a bridgeless totem pole topology, an active bridge topology and so on.

In an embodiment, the AC/DC converter 100 comprises a first DC discharge circuit 12, 15 coupled to the AC input terminals 101, 102. The purpose of this first DC discharge circuit 12, 15 is to provide the possibility to discharge, in a certain event, an eventually charged x-capacitance of the AC/DC converter 100. This x-capacitance may for example be formed between the line L and neutral N of the AC/DC converter 100. For example, the x-capacitance is formed by the non-illustrated total capacitance between input terminals 101 and 102.

For example, if the connection of the AC input signal $V_{in}$ to the AC/DC converter 100 is interrupted, e.g., due to a user decoupling the AC/DC converter 100 from the mains or another event causing interruption of the connection, e.g., a line break, a residual voltage may be stored by a (non-illustrated) capacitance of the AC/DC converter 100, said capacitance being also known as the x-capacitor or, respectively, the x-capacitance. For example, the x-capacitance is the total capacitance of the AC/DC converter 100 storing DC energy after loss of the AC input signal $V_{in}$. Such x-capacitance may need to be discharged quickly and in a controlled manner.

In an embodiment, the first DC discharge circuit 12, 15 comprises a diode path 12 with two anti-serially connected diodes 121, 122 receiving the AC input signal $V_{in}$, and a discharge resistor 15, wherein the discharge resistor 15 couples cathode ports of the anti-serially connected diodes 121, 122 (e.g., at coupling terminal 123) with a second DC discharge circuit 28 of the controller 200 (e.g., at pin 215). The anode port of the diode 121 can be electrically connected to the first input terminal 101, and the anode port of the diode 122 can be electrically connected to the second input terminal 102.

Hence, the first DC discharge circuit 12, 15 can be a passive path section that is itself not controlled and which in particular does not conduct a current, if the second DC discharge circuit 28 is not in a conducting state, the second DC discharge circuit 20 being described in more detail further below.

In an embodiment, regarding solely the AC/DC converter 100, the first DC discharge circuit 12, 15 may be electrically isolating with respect to the input terminals 101, 102. It can be partially electrically conducting, if the second DC discharge circuit 28 is set into a conducting state, which will be explained in more detail further below.

As indicated above, the controller 200 comprises the second DC discharge circuit 28. The second DC discharge circuit has a controllable switching element 283 for switching the second DC discharge circuit 28 on and off, wherein the second DC discharge circuit 28 is operative to receive a DC discharge current from the first DC discharge circuit 12, 15, if the second DC discharge circuit 28 is turned on.

The second DC discharge circuit 28 can comprise a discharge resistor 285. Further, the second DC discharge circuit 28 may be connected to mass/ground 14, e.g., to the same mass/ground as the terminal 162 of the AC/DC converter 100.

The switching element 283 can for example be power semiconductor transistor, such as MOSFET or a derivative thereof. For example, if the switching element 283 is in the on state (i.e., conducting state), the second DC discharge circuit 28 is in the on state. If the switching element 283 is in the off state (i.e., blocking state), the second DC discharge circuit 28 in the off state (i.e., non-conducting state).

For example, the controller 200 comprises the pin 215, which may be a single pin, and a serial connection between the switching element 283 and the discharge resistor 285 is serially connected, by means of the pin 215, to the resistor 15 of the first DC discharge circuit of the AC/DC converter 100. For example, the single pin 215 provides for the serial connection between the first DC discharge circuit 12, 15 of the AC/DC converter 100 and the second DC discharge circuit 28 of the controller 200.

In an embodiment, the first DC discharge circuit 12, 15 of the AC/DC converter 100 and the second DC discharge circuit 28 of the controller 200 jointly form a controllable DC discharge circuit of the power converter apparatus 300 for discharging the x-capacitance of the AC/DC converter 100.

In an embodiment, the second DC discharge circuit 28 of the controller 200 is at least a part of a power supply path of the controller 200. For example, the controller 200 receives its power supply via pins 217 (connected to ground/mass 14) and 216, a capacitor 19 being coupled between these pins 216, 217. Further, a diode 282, e.g., integrated in the controller 200, may be coupled to pin 216, e.g. together with a non-illustrated depletion power semiconductor transistor. Once, the AC/DC converter 100 is in operation controlled by the controller 200, a further power supply path from the AC/DC converter 100 to the controller 200 may supply the controller 200 and the depletion power transistor may be turned off. In this case, the illustrated power supply path is used for startup of the controller 200, only.

The controller 200 comprises a logic, for example including at least components 23, 24, and 25, exemplary embodiments of which being described further below.

The logic of the controller 200 is operative to carry out a method of controlling discharge of the x-capacitance of the AC/DC 100 by controlling the switching element 283, hence, by controlling the DC discharge circuit formed by the first DC discharge circuit 12, 15 of the AC/DC converter 100 and the second DC discharge circuit 28 of the controller 200. Embodiments of this method will be described further below.

Before describing the method of controlling discharge of the x-capacitance, e.g., carried out by the logic of the controller 200, it shall be noted that, in accordance with an embodiment, both the logic 23, 24, 25 carrying out the method of controlling discharge of the x-capacitance of the AC/DC converter 100 and the second DC discharge circuit 28 are integrated within the same single chip integrated circuit (IC). For example, the controller 200 including both the logic 23, 24, 25 and the second DC discharge circuit 28 is implemented within a single chip IC that is integrated within a chip package (not illustrated). The package can include pins 215, 216 and 217 as well as at least one further pin for forming the controller interface 1020.

The method of controlling discharge of the x-capacitance of the AC/DC converter 100, e.g., carried out by the logic of the controller 200, comprises repeatedly carrying out the following steps:

receiving a DC sense signal 281 from the second DC discharge circuit 28 and determining, based on the value of the DC sense signal 281 within a predetermined measurement time period, loss of the AC input signal $V_{in}$;

in response to determining loss of the AC input signal $V_{in}$, turning on the second DC discharge circuit 28;

after elapse of a predetermined discharge time period after turning on the second DC discharge circuit 28, determining the value of the DC sense signal 281 and, if the value has not decreased, turning off the second DC discharge circuit 28 or, if the value has decreased, maintaining the second DC discharge circuit 28 in the on state until a predetermined criterion is reached.

In one embodiment, the controller 200 is operative to comply with the regulations of the safety standard IEC62368-1 regarding discharge of the x-capacitance.

Further optional features of these steps will now be explained.

For example, the second DC discharge circuit 28 is operative to provide the DC sense signal 281 and to at least partially discharge the x-capacitance of the AC/DC converter 100. In an embodiment, the discharge resistor 15 of the first DC discharge circuit of the AC/DC converter 100 is greater (in terms of ohmic value) than the discharge resistor 285 of the second DC discharge circuit 28, so as to ensure that the predominant portion of the discharge power is dissipated external of the controller 200 during the discharge.

Regarding generation of the DC sense signal 281 by means of the second DC discharge circuit 28, two non-limiting variants, which may also be implemented simultaneously, are herein presented.

In accordance with the first variant, the second discharge circuit 28 comprises the discharge resistor 285, wherein the DC sense signal 281 is a voltage signal occurring at the discharge resistor 285, e.g., during the on state of the second DC discharge circuit 28. For example, for receiving the DC sense signal 261 during the measurement time period, the switching element 283 is shortly turned on, e.g., for some µs, e.g., for 30 to 100 µs.

In accordance with the second variant, the second discharge circuit 28 comprises a resistive measurement subpath 286 (cf. dotted block in FIGS. 1 and 2), wherein the DC sense signal 281 is a voltage signal occurring at a measurement point 2863 of the resistive measurement subpath 286, e.g., during the off state of the second DC discharge circuit 28.

Both of the aforesaid variants can be simultaneously implemented.

Determining, based on the value of the DC sense signal 281 within the predetermined measurement time period, loss of the AC input signal $V_{in}$ may comprise determining that discharge of the x-capacitance of the AC/DC converter 100 is necessary. For example, as will become more apparent from the description further below, this determination may include determining that the value of the DC sense signal is constantly above a threshold value during the predetermined measurement time period.

E.g., determining, based on the value of the DC sense signal 281, the loss of the AC input signal $V_{in}$, includes excluding that the AC input signal $V_{in}$ has $V_{in}$ has been lost if the value of the DC sense signal is either increasing or decreasing within the predetermined measurement time period. Such increase or decrease may rather indicate presence of an AC signal. E.g., it can be determined that the DC signal varies, within the predetermined measurement time period, between being greater and being lower than the threshold value, which will be explained in more detail below.

E.g., determining, based on the value of the DC sense signal 281, the loss of the AC input signal $V_{in}$, further includes concluding that the AC input signal $V_{in}$ has been lost if the value of the DC sense signal is constant within the predetermined measurement time period. In this regard, the term "constant" does not necessarily mean that the value itself does not change, but, for example, that the DC sense signal 261 is constantly above the threshold value during the predetermined measurement time period.

Once loss of the AC input signal $V_{in}$ (e.g., which requires discharge of the x-capacitance of the AC/DC converter 100) has been determined, the second DC discharge circuit 28 is turned on, i.e., by turning on the switching element 283. For example, turning on the switching element 283 occurs immediately after, without loss of time, the determination has been made.

Then, after turn-on, the switching element 283 is kept in the on state for at least the predetermined discharge time period. At the point of time when this predetermined discharge time period has elapsed, the value of the DC sense signal 281 is determined again. If the value has not decreased compared to the value determined within the measurement time period, e.g., compared to the last measured value in the predetermined measurement time period, the second DC discharge circuit 28 is turned-off, which interrupts the discharging.

If, however, the value has decreased compared to the value determined within the measurement time period, e.g., compared to the last measured value in the predetermined measurement time period, the second DC discharge circuit 28 is maintained in the on state until the predetermined criterion is reached.

For example, the predetermined criterion is reached if it is determined that the value of the DC sense signal 281 is below the threshold value. For example, this may indicate that the voltage of the x-capacitance of the AC/DC converter is within a safe range, e.g., low enough for carrying out a restart of the power converter apparatus 300 or another response action required to address loss of the AC input signal $V_{in}$.

In an embodiment, the logic 23, 24, 25 of the controller 200 is operative to carry repeatedly carry out the steps at a discharge control frequency within the range of 1 Hz to 400 Hz. It shall be noted, however, that this discharge control frequency/period is not necessarily constant, depending on determinations that are made during carrying out the method, e.g., which kind of control loop is effective (cf. description of FIG. 3 below).

The predetermined discharge time period is for example within the range of 100 μs to 2 s, e.g., within the range of at least some 10 ms.

In an embodiment, the predetermined discharge time period is set based on one or more of the following parameters:
the value of the x-capacitance;
the resistance of resistor 15;
the resistance of resistor 285; and/or
the value of the AC input signal $V_{in}$ (e.g., its rms value).

The predetermined measurement time period is for example within the range of 2.5 ms to 1 s.

In accordance with a further embodiment, if, after elapse of the predetermined discharge time period after turning on the second DC discharge circuit 28, it is determined that the value of the DC sense signal has not decreased, and consequently the second DC discharge circuit 28 is turned off, the logic 23, 24, 25 waits for a predetermined pause time period before carrying out the subsequent determining step, based on the value of the DC sense signal 281, as to whether or not loss of the AC input signal $V_{in}$ is present.

The predetermined pause time period is for example within the range of 100 μs to 2 s.

Figure 3:
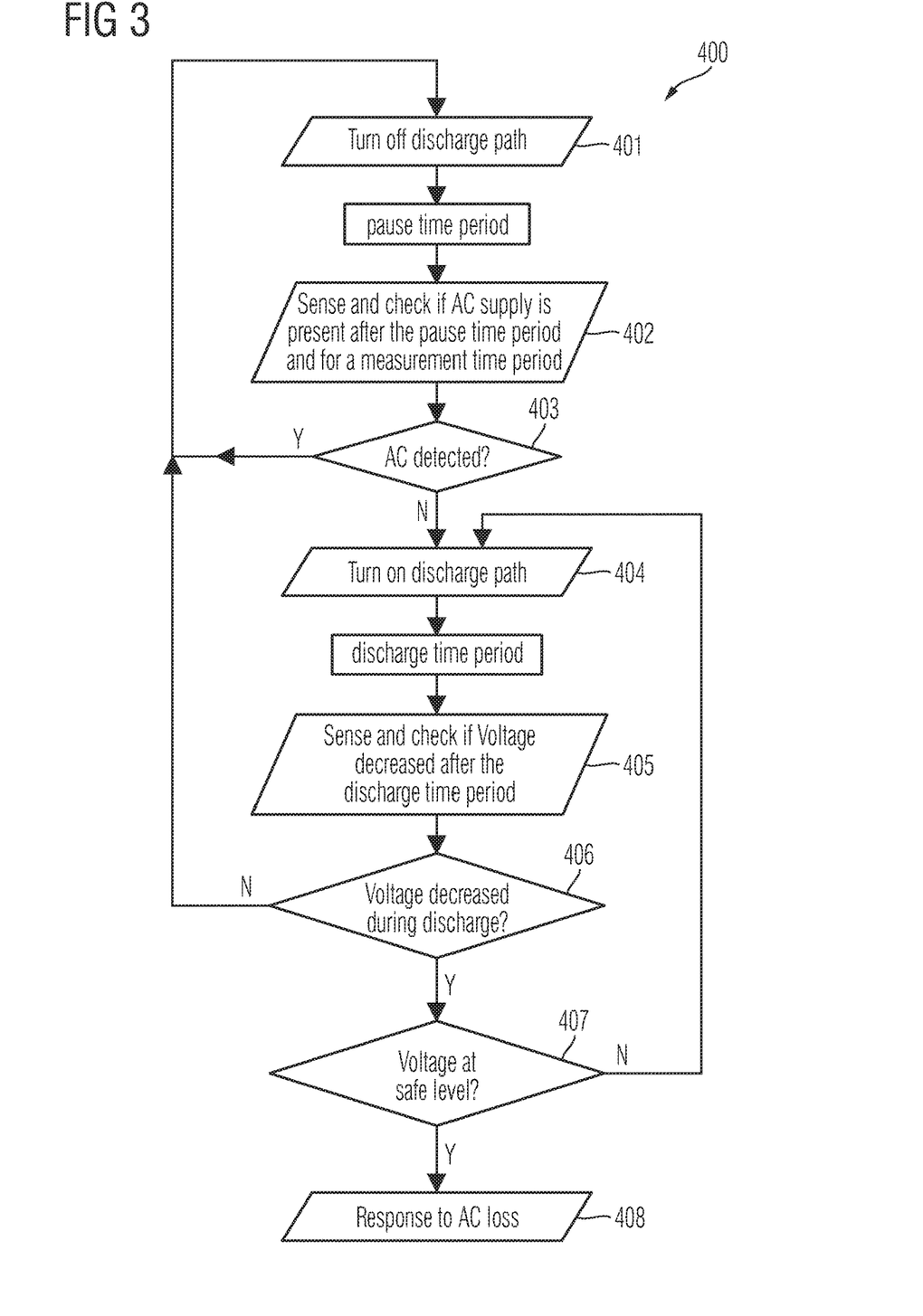
FIG. 3 schematically and exemplarily illustrates a flow diagram of a method of discharging the x-capacitance of an AC/DC converter in accordance with one or more embodiments.
Figure 4A:
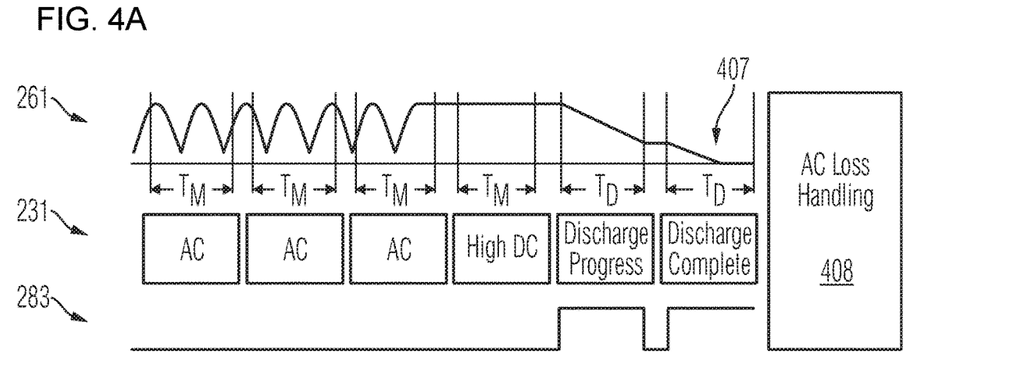
FIGS. 4A, 4B, and 4C each schematically and exemplarily illustrate a method of discharging the x-capacitance of an AC/DC converter in accordance with one or more embodiments.
Figure 4B:
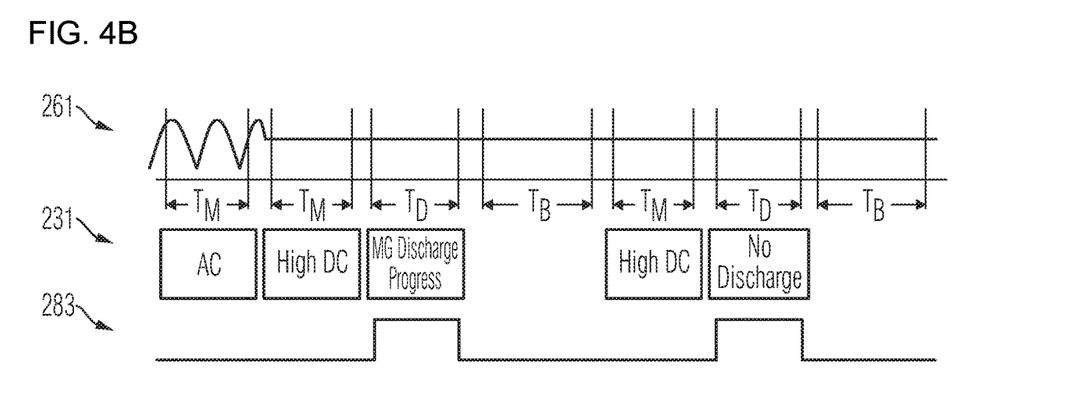
Figure 4C:
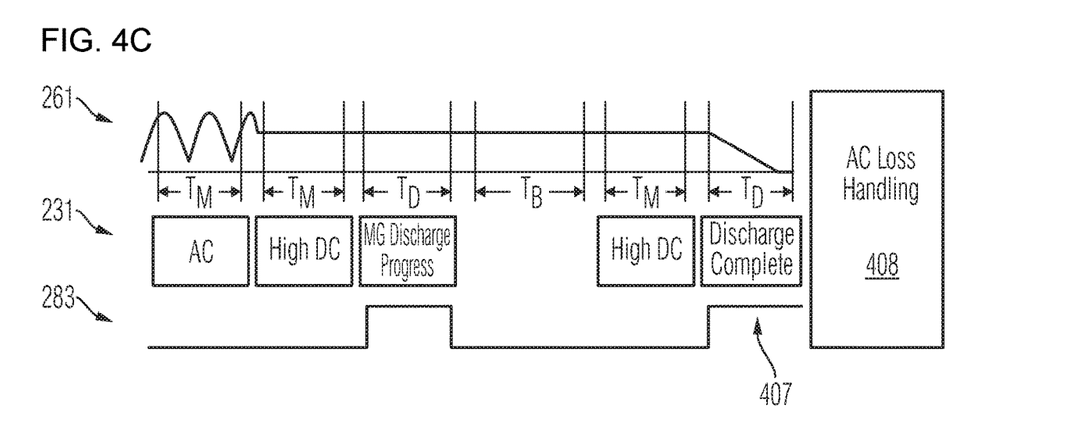

To make exemplary aspects of the method carried out by the logic 23, 24, 25 the controller 200 more clearly, it is now referred to the exemplary flow diagram schematically illustrated in FIG. 3 and, thereafter, to the illustrations in FIGS. 4A, 4B, and 4C.

For example, in step 401 of method 400 (e.g., as carried out by the controller 200), the second DC discharge circuit 28 of the controller 200 is turned off or, respectively, maintained in the off-state, by turning off the switching element 283 or, respectively, maintaining the off-state of the switching element 283. This causes or maintains interruption of the discharging of the x-capacitance of the AC/DC converter 100.

Before, in steps 402 and 403, presence or, respectively, loss of the AC input signal $V_{in}$ is determined, the logic waits for the predetermined pause time period of, e.g., 100 μs to 2 s, to elapse.

In step 402, the DC sense signal 281 is received from the second DC discharge circuit 28 and, during the predetermined measurement time period, its value is continuously or non-continuously sensed so as to determine, in step 403, whether or not loss of the AC input signal $V_{in}$ is present.

If it is determined that loss of the AC input signal $V_{in}$ is not present ("AC detected=YES (Y)"), controller 200 returns to step 401. Hence, in the normal operating state of the AC/DC converter 100, where there is no loss of the AC input signal $V_{in}$, the discharge control frequency is essentially the inverse of the sum of the predetermined pause time period and the and the predetermined measurement time period.

If, however, it is determined, in step 403, that loss of the AC input signal $V_{in}$ (e.g., requiring discharge of the x-capacitance of the AC/DC converter 100) is present ("AC detected=NO (N)"), controller 200 continues with step 404, according to which the second DC discharge circuit 28 is turned on in response to determining the loss of the AC input signal $V_{in}$. As illustrated above, this occurs by turning on the switching element 283, which turns on the entire DC discharge circuit formed by the first DC discharge 12, 15 of the AC/DC converter 100 and the second DC discharge circuit 28 of the controller 200.

The switching element 283 is maintained in the on state for the predetermined discharge time period. After elapse of the same, the value of the DC sense signal 281 is determined again (step 405) and compared (step 406) to the (e.g., last) value obtained during the predetermined measurement time period.

If the value has not decreased ("voltage decreased during discharge=No (N)"), controller 200 returns to step 401 by turning off the switching element 283, thereby interrupting the discharge process.

If the value has decreased ("voltage decreased during discharge=Yes (Y)"), controller 200 maintains the switching element 283 in the on state and continuously checks, whether the value of the DC sense signal 281 has dropped below the threshold (cf. step 407, "voltage at safe level?").

If the value of the DC sense signal 281 is still above the threshold value ("voltage at safe level?=No (N)"), the controller 200 returns to step 404, i.e., by maintaining the switching element 283 in the on state, letting elapse the predetermined discharge time and performing said checks again in steps 406 and 407. FIG. 4A indicates—unlike FIG. 3—that there is a turn-off of the switching element 283. Such turn-off can be appropriate or not, depending on the manner how the DC sense signal 281 is generated. E.g., if the DC sense signal 281 is generated by the subpath 286, said turn-off can be appropriate.

If the value of the DC sense signal 281 has dropped below the threshold value ("voltage at safe level?=Yes (Y)"), the controller 200 may continue with step 408, e.g., by initiating a restart of the power converter apparatus 300 and responding in another manner to the loss of the AC input signal $V_{in}$. Once the power converter apparatus 300 has restarted and operates at normal operating condition, controller 200 continuously carries out method 400, in accordance with an embodiment.

Exemplary aspects for implementing the execution of the above described method 400 within the controller 200 will now described with reference to FIGS. 1 and 2.

As already indicated above, for carrying out the method of controlling discharge of the AC/DC converter 100, the controller 200 may comprise the logic including logic blocks 23, 24 and 25.

Logic block 23 can be a detector, logic block 24 a switch controller, and logic block 25 a timing controller.

For example, the detector 23 is operative to output a detection signal 231, the detection signal 231 indicating whether the value of the DC sense signal 281 is, within the predetermined measurement time period, either
constantly above the threshold value; or
constantly below the threshold value; or
above and below the threshold value.

For example, the threshold value is set by the switch controller 24 and output from the same as a digital signal 242 to Digital-To-Analog-Converter (DAC) 26, which converts the digital signal 242 into the analog signal 261. The analog signal 261 and the DC sense signal 281 are provided to comparator 22, which outputs comparison signal 221 to the detector 23. For example, the comparison signal 221 is a binary signal, a first value (e.g., logic 1/HIGH) indicating that DC sense signal 281 is greater than the threshold value 261, the second value (e.g., logic 0/LOW) indicating that DC sense signal 281 is smaller than the threshold value 261.

For example, the timing controller 25 indicates, by means of a first timing signal 251, to the detector 23 at least one of the predetermined measurement time period and the predetermined pause time period. Thus, based on its input signals 221 and 251, the detector 23 may determine whether the value of the DC sense signal 281 is, within the predetermined measurement time period, either
    constantly above the threshold value; or
    constantly below the threshold value; or
    above and below the threshold value,
and output the detection signal 231 correspondingly.

For example, if the value of the DC sense signal is constantly, within the predetermined measurement time period, above the threshold value, this may indicate that the AC input signal $V_{in}$ has been lost and that the corresponding discharge process for discharging the x-capacitance of the AC/DC converter 200 is to be initiated.

If the value of the DC sense signal is constantly, within the predetermined measurement time period, below the threshold value, this may indicate that the AC input signal $V_{in}$ is not present and that a discharge process for discharging the x-capacitance of the AC/DC converter 200 is not necessary.

If the value of the DC sense signal is, within the predetermined measurement time period, below and above the threshold value, this may indicate that the AC input signal $V_{in}$ is present and, hence, that a discharge process for discharging the x-capacitance of the AC/DC converter 200 is not necessary.

The switch controller 24 receives the detection signal 231 and is operative to generate, based on the detection signal 231, a switch control signal 241 for controlling the switching element 283. The switch control signal 241 can for example be a gate signal, which may be amplified, in accordance with an embodiment, a driver 27 before being fed (as amplified gate signal 241') to the switching element 283, e.g., to a gate terminal of the switching element 283. For example, the switch controller 24 operates not only based on the detection signal 231, but also based on a second timing signal 252 provided by the timing controller 25. E.g., by means of the second timing signal 252, the timing controller 25 indicates, to the switch controller 24, at least the predetermined discharge time period.

Hence, the timing controller 25 can be operative to control operation of at least the switch controller 24 based on the predetermined discharge time period.

It shall be understood that in accordance with the embodiment schematically and exemplarily illustrated in FIG. 1, also the components driver 27, DAC 26 and comparator 22 may be integrated within the same single chip IC as the second DC discharge circuit 28 and the logic components 23, 24, and 25. The same applies to the measurement subpath 286.

Figure 2:
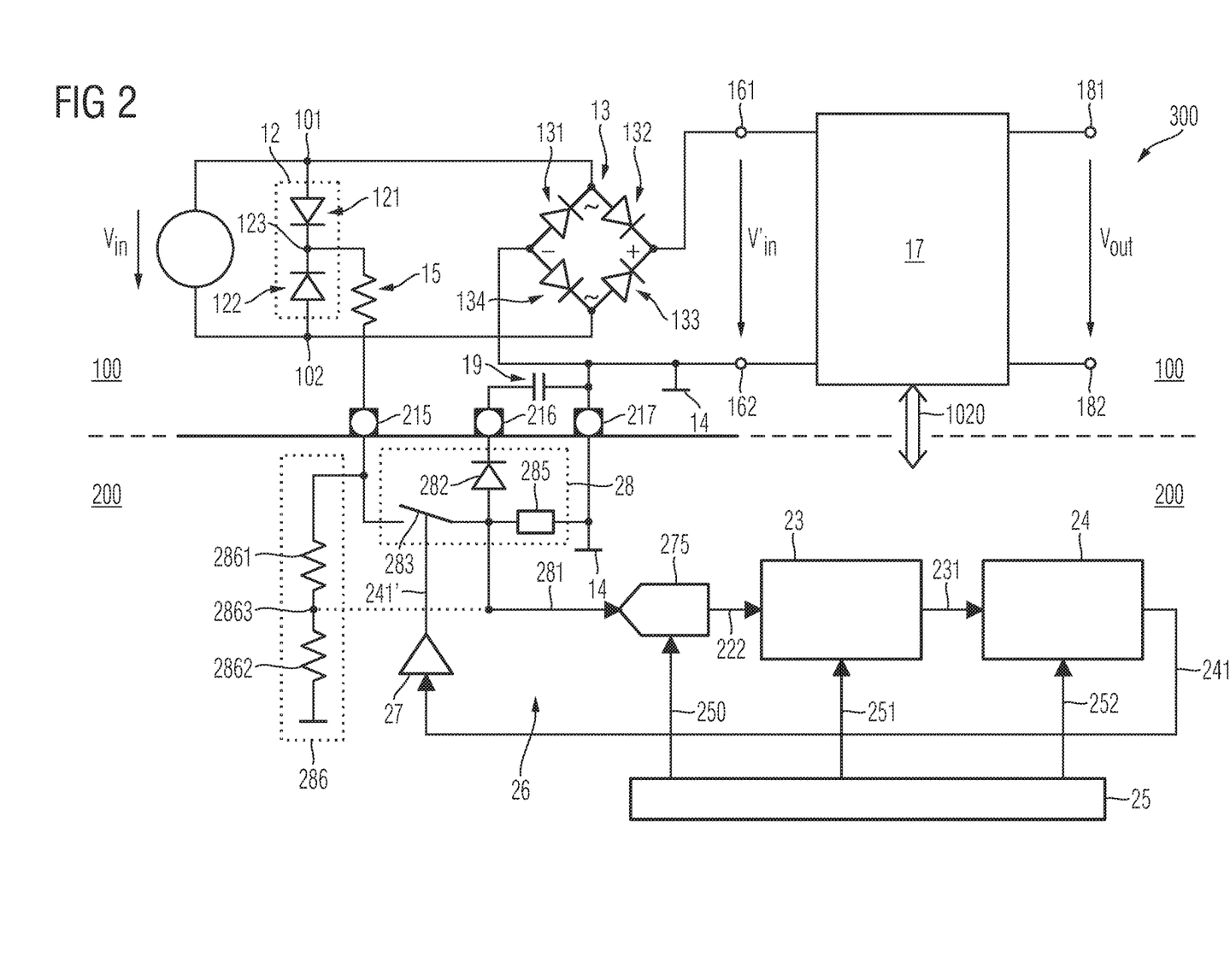
FIG. 2 schematically and exemplarily illustrates a section of a power converter with an AC/DC converter and a controller in accordance with one or more embodiments.

Another option for implementing the logic of the controller 200 that carries out the method of controlling discharge of the x-capacitance of the AC/DC converter 100 is schematically and exemplarily illustrated in FIG. 2. Most of the components illustrated there are equally implemented in the embodiment according to FIG. 1; hence, what has been stated before may equally apply to the embodiment of FIG. 2. In the following, only the differences compared to the embodiment of FIG. 1 will be explained.

For example, the DC sense signal 281 is converted into a digital DC sense signal 222, e.g. by means of a corresponding analog-to-digital converter (ADC) 275. For example, in this case, the comparison with the threshold value is carried out by the detector 23. For example, the threshold value is stored in the detector 23. Hence, the switch controller 24 must not necessarily provide the digital signal 242, as compared to the embodiment of FIG. 1. Further, the timing controller 25 may control operation of the ADC 275 based on the further timing signal 250 which can, for example, trigger an A/D conversion.

Also with respect to FIG. 2, it shall be understood that the ADC 275 may be integrated within the same single chip IC as the remaining components of the controller 200.

FIGS. 4A, 4B, and 4C illustrate three variants of implementing the method 400 as illustrated in FIG. 3, e.g., by means of the controller of FIG. 1 or of FIG. 2. In each of these FIGS. 4A, 4B, and 4C, the upper graph illustrates the DC sense signal 261, the middle section illustrates the detection result, e.g., detection signal 231, and the lower graph illustrates the state (on or off) of the second DC discharge circuit 28, i.e., the state of the switching element 283.

In FIG. 4A, within each of the first three subsequent predetermined measurement time periods $T_M$, the DC sense signal 261 is both low and above the threshold value. The detection signal 231 accordingly indicates that the AC input signal $V_{in}$ is not lost, but present (cf. step 403). Hence, after determination that the AC input signal $V_{in}$ is present, the second DC discharge circuit 28 is not turned, but the switching element 283 remains in the off state (cf. step 401). However, in the fourth measurement time period, it is determined that the AC input signal $V_{in}$ has been lost and that the corresponding discharge process is to be initiated. Accordingly, the switching element 283 is turned on (cf. step 404) and maintained in the on state for at least the predetermined discharge time period $T_D$. After the first elapse of the predetermined discharge time period, the value of the DC sense signal 261 is still above the threshold value (cf. step 407) and, hence, the switching element is turned on again or, respectively, maintained in the on state (cf. step 404). As indicated above, if the DC sense signal 261 is generated by means of the subpath 286, a (short) turn-off of the switching element 283 can be appropriate. After the second discharge progress, it is determined that the value of the DC sense signal 261 has sufficiently decreased and thereafter, actions for appropriately responding to the loss of the AC input signal can be carried out (cf. step 408).

FIG. 4B illustrates a different situation. There, loss of the AC input signal $V_{in}$ is determined in the second cycle. However, in the third cycle, even after having turned on the second DC discharge circuit 28, it is determined that the value of the DC sense signal 261 has not decreased (cf. step 406). Hence, the second DC discharge circuit 28 is turned off (cf. step 401) and the predetermined pause time period $T_B$ is allowed to elapse before further actions are carried out. Thereafter, the same repeats (loss of the AC input signal $V_{in}$ is determined and in the next cycle, even after having turned on the second DC discharge circuit 28, it is determined that the value of the DC sense signal 261 has not decreased). This sequence of steps is repeated until the DC sense signal 261 is determined to have a value below the threshold value (cf. step 407). The situation as illustrated in FIG. 4B may be considered to correspond to a detection that a DC input signal is present at the input terminals 101, 102 rather than the AC input signal $V_{in}$.

A yet different situation is illustrated in FIG. 4C, which starts identically as compared to the situation of FIG. 4B. But, in the control loop that started after it has been determined that the value of the DC sense signal 261 has not decreased (cf. step 406), and after elapse of the predetermined pause time period $T_B$ and the subsequent determination that the AC input signal $V_{in}$ is (still) lost, the turn on of the second DC discharge circuit 28 is again initiated and it is determined, already before elapse of the predetermined discharge time period, that the DC sense signal 261 has a value below the threshold value, such that it may be responded to the AC input loss (cf. step. 408).

Presented herein are, as described in the introduction, each of a controller for an AC/DC converter, a converter apparatus having an AC/DC converter and a controller coupled thereto, and a method of controlling discharge of an AC/DC converter.

It shall be understood that the embodiments of each of these aspects (controller, converter apparatus and method) correspond to each other. Hence, what has been stated in the above with respect to the controller may analogously apply to both the apparatus and the method, and what has been stated in the above with respect to the apparatus may analogously apply to both the controller and the method, and what has been stated in the above with respect to the method may analogously apply to both the controller and the apparatus.

Regarding all embodiments, it shall be understood that the above mentioned parameters, for example the predetermined discharge time period, the predetermined measurement time period, the predetermined pause time period, and the threshold value may be adaptively adjusted, e.g., in dependence of the application where the power converter apparatus 300 is employed. E.g., as indicated above, in an embodiment, the AC input signal $V_{in}$ is provided by the mains. Hence, the AC input signal $V_{in}$ can be an alternating voltage, e.g., the 120 V/60 Hz voltage, or the 230 V/50 Hz voltage. In yet another embodiment, the AC input signal $V_{in}$ is provided by a UPS (uninterruptible power supply) where the AC input signal $V_{in}$ may rather resemble a square wave than a sine wave. For example each of the predetermined discharge time period, the predetermined measurement time period, the predetermined pause time period, and the threshold value may be adapted to the mains/UPS voltage. Further, the threshold value may be adaptively adjusted so as to allow for reliable detection of the loss of the AC input signal $V_{in}$.

The measurement time period may for example adapt to the AC input signal, for example with regards to AC line frequency and phase. The discharge time period may also adapt to the AC input signal, e.g., to the AC line rms voltage, and/or to the total x-capacitance and the total discharge resistance of resistors 15, 285. The pause time period may also adapt to the AC input signal, e.g., to the AC line voltage, and/or to the power rating of the components of the discharge circuits 12, 53, 28.

Spatially relative terms such as "under", "below", "lower", "over", "upper" and the like, are used for ease of description to explain the positioning of one element relative to a second element. These terms are intended to encompass different orientations of the respective device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", "exhibiting" and the like are open ended terms that indicate the presence of stated elements or features, but do not preclude additional elements or features.

With the above range of variations and applications in mind, it should be understood that the present invention is not limited by the foregoing description, nor is it limited by the accompanying drawings. Instead, the present invention is limited only by the following claims and their legal equivalents.

The invention claimed is:

1. A controller for an AC/DC converter, the AC/DC converter being operative to receive, via AC input terminals, an AC input signal and to transform the AC input signal into a DC output signal, wherein the AC/DC converter comprises a first DC discharge circuit coupled to the AC input terminals, the controller comprising:

a second DC discharge circuit including a switch element for switching the second DC discharge circuit on and off, the switch element selectively coupling the first DC discharge circuit to the second DC discharge circuit, wherein the second DC discharge circuit is operative to receive a DC discharge current from the first DC discharge circuit through the switch element during a condition in which the switch element is in an ON-state;

logic operative to:
  receive a DC sense signal from the second DC discharge circuit and determine, based on a value of the DC sense signal within a predetermined measurement time period, loss of the AC input signal;
  in response to determining loss of the AC input signal, turn on the second DC discharge circuit via controlling the switch element to the ON-state;
  after elapse of a predetermined discharge time period after turning on the second DC discharge circuit via activation of the switch element to the ON-state, determining the value of the DC sense signal; and
  control a state of the second DC discharge circuit via control of the switch element depending on a magnitude of the value of the DC sense signal;

wherein the logic further includes:
  a comparator;
  wherein activation of the switch element to the ON-state electrically couples the first DC discharge circuit to: i) the second DC discharge circuit, and ii) a first input of the comparator; and
  wherein the comparator is operative to compare the magnitude of the DC sense signal to a threshold value inputted to a second input of the comparator.

2. The controller of claim 1, wherein the second DC discharge circuit is operative to provide the DC sense signal and at least partially discharge an x-capacitance of the AC/DC converter.

3. The controller of claim 1, wherein the logic is operative to repeatedly carry out discharge operations at a discharge control frequency within the range of 1 Hz (Hertz) to 400 Hz.

4. The controller of claim 1, wherein the predetermined discharge time period is within a range of 100 µs to 2 seconds.

5. The controller of claim 1, wherein the predetermined measurement time period is within a range of 2.5 ms to 1 second.

6. The controller of claim 1, wherein the predetermined discharge time period is set based on one or more parameters associated with the AC/DC converter, the one or more parameters including:

a value of an x-capacitance;
a resistance of a resistor; and
a magnitude of the AC input signal.

7. The controller of claim 1, wherein the logic is operative to adaptively adjust at least one of the predetermined discharge time period and the predetermined measurement time period.

8. The controller of claim 1, wherein determining, based on the value of the DC sense signal, the loss of the AC input signal, includes:
concluding that the AC input signal has not been lost in response to detecting that the value of the DC sense signal is changing within the predetermined measurement time period;
concluding that the AC input signal has been lost in response to detecting that the value of the DC sense signal is constant within the predetermined measurement time period.

9. The controller of claim 1, wherein the logic comprises a detector, a switch controller, and timing controller, wherein:
the detector is operative to output a detection signal, the detection signal indicating a state of the DC sense signal;
the switch controller being further operative to generate, based on the detection signal, a switch control signal for controlling the switch element; and
the timing controller is operative to control operation of at least the switch controller based on the predetermined discharge time period.

10. The controller of claim 9, wherein the logic is operative to adaptively adjust the threshold value, the DC sense signal compared to the threshold value.

11. The controller of claim 1, wherein the controller is operative to determine that the value of the DC sense signal is below a threshold value.

12. The controller of claim 1, wherein the second discharge circuit comprises a discharge resistor, and wherein the DC sense signal includes a voltage signal occurring at the discharge resistor.

13. The controller of claim 1, wherein the second discharge circuit comprises a resistive measurement subpath, and wherein the DC sense signal includes a voltage signal occurring at a measurement point of the resistive measurement subpath.

14. The controller of claim 1, wherein the second DC discharge circuit is at least a part of a power supply path of the controller.

15. The controller of claim 1, wherein the second DC discharge circuit and the logic are integrated within a same single chip integrated circuit.

16. The controller of claim 1 further comprising a single pin for serial connection between the first DC discharge circuit and the second DC discharge circuit.

17. The controller of claim 1, wherein the first DC discharge circuit comprises a discharge resistor and two anti-serially connected diodes receiving the AC input signal, wherein the discharge resistor couples cathode ports of the anti-serially connected diodes with the second DC discharge circuit of the controller.

18. A method of controlling discharge of an AC/DC converter, the AC/DC converter being operative to receive, via AC input terminals, an AC input signal and to transform the AC input signal into a DC output signal, wherein the AC/DC converter comprises a first DC discharge circuit coupled to AC input terminals, the method comprising:
employing a controller having a second DC discharge circuit having a controllable switch element, controlled states of the switch element controlling electrical connectivity of the first DC discharge circuit to the second DC discharge circuit, wherein the second DC discharge circuit is operative to receive a DC discharge current from the first DC discharge circuit through the switch element during a condition in which the switch element is in an ON-state, the method comprising repeatedly carrying out operations of:
receiving a DC sense signal from the second DC discharge circuit;
determining, based on a value of the DC sense signal within a predetermined measurement time period, loss of the AC input signal;
in response to determining loss of the AC input signal, turning on the second DC discharge circuit;
after elapse of a predetermined discharge time period after turning on the second DC discharge circuit via activation of the switch element, determining the value of the DC sense signal and, controlling a state of the DC discharge circuit depending on a magnitude of the value of the DC sense signal;
wherein activation of the switch element to the ON-state electrically couples the first DC discharge circuit to: i) the second DC discharge circuit, and ii) a first input of a comparator; and
via the comparator, comparing the magnitude of the DC sense signal to a threshold value inputted to a second input of the comparator.

19. The controller of claim 1, wherein the logic is further operative to: turn off the second DC discharge circuit via deactivation of the switch element in response to detecting that the value of the DC sense signal has not decreased.

20. The controller of claim 1, wherein the logic is further operative to: electrically couple the first DC discharge circuit to the second DC discharge circuit via activation of the switch element to the ON-state until a predetermined criterion is reached.

21. The method of claim 18, wherein controlling the state of the second DC discharge circuit depending on the magnitude of the value of the DC sense signal includes:
via deactivation of the switch element, electrically decoupling the second DC discharge circuit from the first DC discharge circuit in response to detecting that the value has not decreased.

22. The method of claim 18, wherein controlling the state of the second DC discharge circuit depending on a magnitude of the value of the DC sense signal includes:
via activation of the switch element, electrically coupling the second DC discharge circuit to the first DC discharge circuit until a predetermined criterion is reached.

23. The controller as in claim 1, wherein the second DC discharge circuit includes a resistor through which the DC discharge current from the first DC discharge circuit is discharged to a reference voltage during activation of the switch element to the ON-state.

24. The controller as in claim 1, wherein the second DC discharge circuit includes a diode in series with a capacitor coupled to a reference voltage, the DC discharge current charging the capacitor during a condition in which the switch element is activated to the ON-state.

25. The controller as in claim 1, wherein the second DC discharge circuit includes a resistor through which the DC discharge current from the first DC discharge circuit is discharged to a reference voltage during a condition in which the switch element is activated to the ON-state, the resistor disposed in parallel to a series circuit including a diode in series with a capacitor coupled to the reference voltage.

26. The controller as in claim 1, wherein the logic is operative to deactivate the switch element in response to detecting that the magnitude of the value of the DC sense signal does not decrease within the predetermined measurement time period when the switch element is activated to the ON-state.

27. The controller as in claim 1, wherein the second DC discharge circuit includes a discharge path to a reference voltage.

28. The controller as in claim 1, wherein the logic controls activation of the switch element based on an output of the comparator.

* * * * *